US011477009B2

(12) United States Patent
Takatsukasa (10) Patent No.: US 11,477,009 B2
(45) Date of Patent: Oct. 18, 2022

(54) INFORMATION PROCESSING APPARATUS AND METHOD

(71) Applicant: FUJI ELECTRIC CO., LTD., Kanagawa (JP)

(72) Inventor: Kenji Takatsukasa, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 74 days.

(21) Appl. No.: 17/000,699

(22) Filed: Aug. 24, 2020

(65) Prior Publication Data

US 2021/0135842 A1    May 6, 2021

(30) Foreign Application Priority Data

Oct. 30, 2019   (JP) ............................ JP2019-197634

(51) Int. Cl.
*H04L 9/06*   (2006.01)

(52) U.S. Cl.
CPC .......... *H04L 9/0631* (2013.01); *H04L 9/0637* (2013.01); *H04L 2209/046* (2013.01); *H04L 2209/16* (2013.01)

(58) Field of Classification Search
CPC ............ H04L 9/0631; H04L 9/0637; H04L 2209/046; H04L 2209/16; H04L 2209/24; H04L 9/0618; H04L 9/0625
See application file for complete search history.

(56) References Cited

U.S. PATENT DOCUMENTS

| 6,185,304 | B1* | 2/2001 | Coppersmith | H04L 9/002 380/37 |
| 6,185,679 | B1* | 2/2001 | Coppersmith | H04L 9/002 380/37 |
| 6,189,095 | B1* | 2/2001 | Coppersmith | H04L 9/002 380/37 |
| 6,199,162 | B1* | 3/2001 | Luyster | H04L 9/002 713/168 |
| 6,324,286 | B1* | 11/2001 | Lai | H04L 9/0637 380/37 |
| 8,102,997 | B2* | 1/2012 | Teglia | H04L 9/003 380/37 |
| 8,670,559 | B2* | 3/2014 | Michiels | G06F 7/723 380/28 |

(Continued)

FOREIGN PATENT DOCUMENTS

| JP | 2014-180061 | 9/2014 |
| JP | 2017-044757 | 3/2017 |

(Continued)

OTHER PUBLICATIONS

De Mulder et al., Cryptanalysis of the Xiao-Lai White-Box AES Implementation, Springer-Verlag, 2013.*

(Continued)

*Primary Examiner* — David Garcia Cervetti
(74) *Attorney, Agent, or Firm* — IPUSA, PLLC (57) ABSTRACT

An information processing apparatus includes a processor that acquires an operation result on an input data by referring to a look-up table that stores an operation result of an operation process, including an obfuscating operation that includes ordering of bits, an exclusive-OR operation on a random number, and a multiplication on a Galois field, performed on data.

16 Claims, 6 Drawing Sheets

(56) References Cited

U.S. PATENT DOCUMENTS

| | | | |
|---|---|---|---|
| 9,654,280 B2* | 5/2017 | Michiels | H04L 9/002 |
| 9,843,441 B2* | 12/2017 | Mathew | H04L 9/0631 |
| 9,992,018 B1* | 6/2018 | Tjew | H04L 9/3271 |
| 10,097,343 B2* | 10/2018 | Takatsukasa | G09C 1/00 |
| 10,148,427 B2* | 12/2018 | Takatsukasa | H04L 9/0631 |
| 10,237,066 B1* | 3/2019 | Langhammer | H04L 9/0637 |
| 2002/0066014 A1* | 5/2002 | Dworkin | H04L 9/0643 |
| | | | 713/168 |
| 2002/0131588 A1* | 9/2002 | Yang | H04L 9/065 |
| | | | 380/37 |
| 2003/0084304 A1* | 5/2003 | Hon | H04L 63/0838 |
| | | | 713/185 |
| 2003/0099352 A1* | 5/2003 | Lu | H04L 9/0631 |
| | | | 380/37 |
| 2003/0108195 A1* | 6/2003 | Okada | H04L 9/0631 |
| | | | 380/37 |
| 2004/0139340 A1* | 7/2004 | Johnson | H04L 9/0625 |
| | | | 380/1 |
| 2004/0184602 A1* | 9/2004 | Nadehara | H04L 9/0631 |
| | | | 380/28 |
| 2004/0202318 A1* | 10/2004 | Lu | H04L 9/0631 |
| | | | 380/29 |
| 2005/0169463 A1* | 8/2005 | Ahn | H04L 9/0631 |
| | | | 380/28 |
| 2006/0002548 A1* | 1/2006 | Chu | H04L 9/0631 |
| | | | 380/28 |
| 2006/0018477 A1* | 1/2006 | Jalfon | H04L 9/0631 |
| | | | 380/259 |
| 2006/0023875 A1* | 2/2006 | Graunke | H04L 9/065 |
| | | | 380/28 |
| 2006/0126843 A1* | 6/2006 | Brickell | H04L 9/0637 |
| | | | 380/260 |
| 2006/0147040 A1* | 7/2006 | Lee | H04L 9/0631 |
| | | | 380/28 |
| 2006/0177052 A1* | 8/2006 | Hubert | H04L 9/003 |
| | | | 380/29 |
| 2006/0206696 A1* | 9/2006 | Saito | G06F 15/7867 |
| | | | 712/227 |
| 2006/0265604 A1* | 11/2006 | Dirscherl | H04L 9/0618 |
| | | | 713/193 |
| 2007/0189536 A1* | 8/2007 | Gammel | H04L 9/004 |
| | | | 380/259 |
| 2007/0286416 A1* | 12/2007 | Bertoni | H04L 9/0637 |
| | | | 380/37 |
| 2008/0008314 A1* | 1/2008 | Dempski | G09C 5/00 |
| | | | 380/37 |
| 2008/0019524 A1* | 1/2008 | Kim | H04L 9/0631 |
| | | | 380/259 |
| 2008/0046756 A1* | 2/2008 | Dempski | G06T 11/203 |
| | | | 713/187 |
| 2008/0056488 A1* | 3/2008 | Motoyama | G06F 7/00 |
| | | | 380/28 |
| 2008/0056490 A1* | 3/2008 | Akishita | H04L 9/0625 |
| | | | 380/44 |
| 2008/0062803 A1* | 3/2008 | Fronte | G06F 21/72 |
| | | | 365/230.03 |
| 2008/0240422 A1* | 10/2008 | Ozturk | G06F 9/30007 |
| | | | 380/28 |
| 2008/0260145 A1* | 10/2008 | Trichina | H04L 9/003 |
| | | | 380/46 |
| 2009/0003589 A1* | 1/2009 | Mathew | H04L 9/0631 |
| | | | 380/28 |
| 2009/0003598 A1* | 1/2009 | Itoh | H04L 9/0631 |
| | | | 380/46 |
| 2009/0097639 A1* | 4/2009 | Hotta | H04L 9/0631 |
| | | | 380/29 |
| 2009/0119355 A1* | 5/2009 | Nakagoe | H04L 9/0631 |
| | | | 708/200 |
| 2009/0158051 A1* | 6/2009 | Michiels | H04L 9/002 |
| | | | 713/189 |
| 2009/0254759 A1* | 10/2009 | Michiels | H04L 9/06 |
| | | | 713/189 |
| 2010/0014664 A1* | 1/2010 | Shirai | H04L 9/003 |
| | | | 380/28 |
| 2010/0054461 A1* | 3/2010 | Ciet | H04L 9/0618 |
| | | | 380/29 |
| 2010/0067687 A1* | 3/2010 | Chandramouli | H04L 9/0618 |
| | | | 380/37 |
| 2010/0080395 A1* | 4/2010 | Michiels | H04L 9/0631 |
| | | | 380/278 |
| 2010/0195820 A1* | 8/2010 | Frank | H04L 9/0631 |
| | | | 380/28 |
| 2011/0200190 A1* | 8/2011 | Hisakado | H04L 9/0618 |
| | | | 708/250 |
| 2012/0002807 A1* | 1/2012 | Michiels | H04L 9/002 |
| | | | 380/28 |
| 2012/0093313 A1* | 4/2012 | Michiels | G09C 1/00 |
| | | | 380/255 |
| 2012/0254625 A1* | 10/2012 | Farrugia | G06F 21/52 |
| | | | 713/189 |
| 2014/0351603 A1* | 11/2014 | Feix | G06F 21/72 |
| | | | 713/189 |
| 2015/0043731 A1* | 2/2015 | Lee | H04L 9/0631 |
| | | | 380/42 |
| 2015/0163051 A1* | 6/2015 | Suzuki | H04L 9/0631 |
| | | | 713/189 |
| 2015/0215117 A1* | 7/2015 | Kim | H04L 9/0631 |
| | | | 380/28 |
| 2015/0222423 A1* | 8/2015 | Pepin | H04L 9/0631 |
| | | | 713/189 |
| 2015/0312042 A1* | 10/2015 | Michiels | H04L 9/3242 |
| | | | 380/28 |
| 2015/0312223 A1* | 10/2015 | Michiels | G06F 21/51 |
| | | | 713/168 |
| 2015/0312224 A1* | 10/2015 | Michiels | H04L 9/0631 |
| | | | 713/168 |
| 2015/0312225 A1* | 10/2015 | Michiels | H04L 63/0428 |
| | | | 713/168 |
| 2015/0312226 A1* | 10/2015 | Michiels | H04L 63/123 |
| | | | 713/168 |
| 2015/0324302 A1* | 11/2015 | Lee | H04L 9/08 |
| | | | 713/193 |
| 2015/0349951 A1* | 12/2015 | Farrugia | G06F 9/30007 |
| | | | 380/28 |
| 2015/0372989 A1* | 12/2015 | Michiels | H04L 9/0631 |
| | | | 713/168 |
| 2016/0012237 A1* | 1/2016 | Eftekhari | H04L 9/004 |
| | | | 713/189 |
| 2016/0013931 A1* | 1/2016 | Pisek | H04L 9/0631 |
| | | | 380/28 |
| 2016/0048689 A1* | 2/2016 | Wiener | G06F 21/602 |
| | | | 713/189 |
| 2016/0078250 A1* | 3/2016 | Michiels | G06F 21/53 |
| | | | 713/189 |
| 2016/0110943 A1* | 4/2016 | Nicely | G07F 17/3269 |
| | | | 463/20 |
| 2016/0127123 A1* | 5/2016 | Johnson | H04L 9/003 |
| | | | 713/189 |
| 2016/0267258 A1* | 9/2016 | Michiels | G06F 21/14 |
| 2016/0269175 A1* | 9/2016 | Cammarota | H04L 9/002 |
| 2016/0315764 A1* | 10/2016 | Willemse | G06F 11/0736 |
| 2016/0330019 A1* | 11/2016 | Michiels | H04L 9/0631 |
| 2016/0350520 A1* | 12/2016 | Michiels | G06F 21/14 |
| 2016/0350560 A1* | 12/2016 | Hoogerbrugge | H04L 9/002 |
| 2017/0033921 A1* | 2/2017 | Michiels | G06F 21/14 |
| 2017/0033922 A1* | 2/2017 | Michiels | H04L 9/0625 |
| 2017/0141911 A1* | 5/2017 | Michiels | H04L 9/003 |
| 2017/0149559 A1* | 5/2017 | Michiels | H04L 9/0625 |
| 2017/0180119 A1* | 6/2017 | Michiels | H04L 9/14 |
| 2017/0200010 A1* | 7/2017 | Fu | H04L 63/10 |
| 2017/0272238 A1* | 9/2017 | Takatsukasa | G09C 1/00 |
| 2017/0286647 A1* | 10/2017 | Michiels | G06F 21/16 |
| 2017/0293572 A1* | 10/2017 | Satpathy | H04L 9/0631 |
| 2017/0353298 A1* | 12/2017 | Ghosh | G06F 21/602 |
| 2017/0353299 A1* | 12/2017 | Takatsukasa | G06F 21/85 |
| 2017/0353300 A1* | 12/2017 | Takatsukasa | G09C 1/00 |
| 2018/0089467 A1* | 3/2018 | Pedersen | H04L 9/0631 |

(56) References Cited

U.S. PATENT DOCUMENTS

| | | | |
|---|---|---|---|
| 2018/0167196 A1* | 6/2018 | Cooper | G06F 21/72 |
| 2018/0183576 A1* | 6/2018 | Wang | H04L 9/0631 |
| 2018/0351743 A1* | 12/2018 | Michiels | H04L 9/32 |
| 2019/0116022 A1* | 4/2019 | Kim | A61K 38/1793 |
| 2019/0132116 A1* | 5/2019 | Michiels | H04L 9/14 |
| 2019/0179618 A1* | 6/2019 | Noor | H04L 9/0637 |
| 2019/0182046 A1* | 6/2019 | Rangaraj | H04L 9/0618 |
| 2019/0229889 A1* | 7/2019 | Kounavis | H04L 9/0631 |
| 2019/0305930 A1* | 10/2019 | Bauer | H04L 9/002 |
| 2020/0004992 A1* | 1/2020 | Chong | G06F 21/6218 |
| 2020/0044822 A1* | 2/2020 | Kotha | H04L 9/0631 |
| 2020/0092081 A1* | 3/2020 | Rietman | H04L 9/0618 |
| 2020/0160755 A1* | 5/2020 | Isobe | H04L 9/0625 |
| 2020/0162113 A1* | 5/2020 | Hong | H03M 13/45 |
| 2020/0313847 A1* | 10/2020 | Plusquellic | H04L 9/0631 |
| 2020/0328877 A1* | 10/2020 | Muthineni | H04L 9/0631 |

FOREIGN PATENT DOCUMENTS

| | | |
|---|---|---|
| JP | 2017-167390 | 9/2017 |
| JP | 2017-216619 | 12/2017 |

OTHER PUBLICATIONS

Serpa, Ana Clara Zoppi et al. "A Secure White Box Implementation of AES Against First Order DCA." Anais do XIX Simpósio Brasileiro de Segurança da Informação e de Sistemas Computacionais (SBSeg 2019),2019.*
Chow et al., White-Box Cryptography and an AES Implementation, Springer-Verlag, 2003.*
Luo et al., A New Attempt of White-box AES Implementation, IEEE, 2014.*
James Muir, A Tutorial on White-box AES, Mathematics in Industry, 2013.*
Lee et al., A Masked White-Box Cryptographic Implementation for Protecting Against Differential Computation Analysis, IEEE, 2018.*

* cited by examiner

INFORMATION PROCESSING APPARATUS AND METHOD

CROSS-REFERENCE TO RELATED APPLICATIONS

This application is based upon and claims priority to Japanese Patent Application No. 2019-197634, filed on Oct. 30, 2019, the entire contents of which are incorporated herein by reference.

BACKGROUND OF THE INVENTION

1. Field of the Invention

The present invention relates to an information processing apparatus, an information processing method, and a computer-readable storage medium.

2. Description of the Related Art

Internet of Things (IoT), representing new technologies in the connected era, connects a various kinds of devices to communication networks. While many of these devices are low-cost devices, these devices include a microprocessor or the like implementing applications, and also implement various cryptographic functions as security measures.

In common key cryptosystems such as the Advanced Encryption Standard (AES) or the like, one of the security requirements is to prevent the leakage and decryption of the common key (hereinafter also referred to as "encryption key", or simply "key"). White-box cryptography is one known method of preventing the leakage and decryption of the encryption key (refer to Japanese Laid-Open Patent Publication No. 2014-180061, for example).

Related techniques include reducing the data size of a look-up table used in white-box cryptography, and obfuscating the encryption key by white-box cryptography (refer to Japanese Laid-Open Patent Publication No. 2017-044757, Japanese Laid-Open Patent Publication No. 2017-167390, and Japanese Laid-Open Patent Publication No. 2017-216619, for example).

However, the computing performance of general-purpose computers or the like is improving every day, and a decryption risk of the encryption key in conventional white-box cryptography is also increasing every day.

SUMMARY OF THE INVENTION

The disclosed technique has been developed in view of the foregoing, and one object is to improve the security with respect to encryption key decryption in the white-box cryptography.

According to one aspect of the embodiments, an information processing apparatus includes a memory device configured to store a program; and a processor configured to execute the program and perform a process including referring to a look-up table that stores an operation result of an operation process, including an obfuscating operation that includes ordering of bits, an exclusive-OR operation on a random number, and a multiplication on a Galois field, performed on data; and acquiring an operation result on an input data from the look-up table.

Other objects and further features of the present invention will be apparent from the following detailed description when read in conjunction with the accompanying drawings.

DESCRIPTION OF THE PREFERRED EMBODIMENTS

One embodiment of the present invention will be described in the following. In this embodiment, a cryptographic system 10 which will be described adds an obfuscating component to a computing process that is realized using a look-up table, to improve the security with respect to encryption key decryption in the white-box cryptography. It is assumed that the cryptographic system 10 according to this embodiment is an embedded system implemented in a general microprocessor or the like. The embedded system is embedded in an industrial device, a home appliance, or the like, for example, and is capable of performing a specific function. More particularly, the cryptographic system 10 according to this embodiment can be embedded into a smart meter used by a Home Energy Management System (HEMS), or the like, for example.

However, the encryption system 10 according to this embodiment is not limited to the embedded system. For example, the encryption system 10 may be various types of terminals or devices, such as a Personal Computer (PC), a smartphone, a tablet terminal, or the like.

<Theoretical Configuration>

First, a theoretical configuration of the encryption according to this embodiment will be described. In this embodiment, the Advanced Encryption Standard (AES) is employed as the cryptosystem. However, this embodiment is applicable to arbitrary common key cryptosystems implemented in the white-box cryptography, other than the AES.

In the white-box AES in which the AES is implemented in the white-box cryptography, results of a computing process using the key (encryption key), and an inverse transformation process and a transformation process added before and after this computing process (however, only the transformation process is added after the computing process in the case of the first round), in each round, are obtained using the look-up table. The addition of this transformation process obfuscates the key, to prevent the key from being decrypted from the look-up table.

In addition, in the white-box AES, there is a computing process of exclusive OR, between a referencing (or look-up) process of the look-up table in each round, and a referencing (or look-up) process of the look-up table in a round next to each round. For this reason, in the transformation process and the inverse transformation process described above, a relationship between the transformation and the inverse transformation must also stand before and after the computing process of the exclusive OR. As examples of the transformation process and the inverse transformation process in which the relationship between the transformation and the inverse transformation stands before and after the computing process of the exclusive OR, Japanese Laid-Open Patent Publication No. 2017-044757, Japanese Laid-Open Patent Publication No. 2017-167390, and Japanese Laid-Open Patent Publication No. 2017-216619, for example, describe sorting of bits using random numbers, exclusive OR of random numbers, or the like.

In this embodiment, as the transformation process and the inverse transformation process, a multiply (multiplication) on the Galois field is added, in addition to the sorting the bits using the random numbers, and the exclusive OR of the random numbers. Hence, in this embodiment, the key can be obfuscated with a higher strength (that is, a higher degree of obfuscation), thereby enabling the security of the white-box cryptography to be improved.

In the AES, a process with respect to a 16-byte data is regarded as one round, and the data is encrypted by repeatedly executing a number of rounds according to a bit length of the key. In addition, in one round, a process with respect to 4 bytes is regarded as one sub-round, and 4 sub-rounds are executed. Hereafter, it is assumed that an index representing the round is r (where r>=0), and an index representing the sub-round is s (where s>=0).

[First Round]

First, the process of the first round of encryption by the white-box AES according to this embodiment (that is, when r=0) will be described. In the first round of the encryption, a 16-byte plaintext is input, and a 16-byte intermediate value of the first round is output. A 1-byte data of a dth byte of the 16-byte data (plaintext, intermediate value, or the like) is represented by "d–1".

Figure 1:
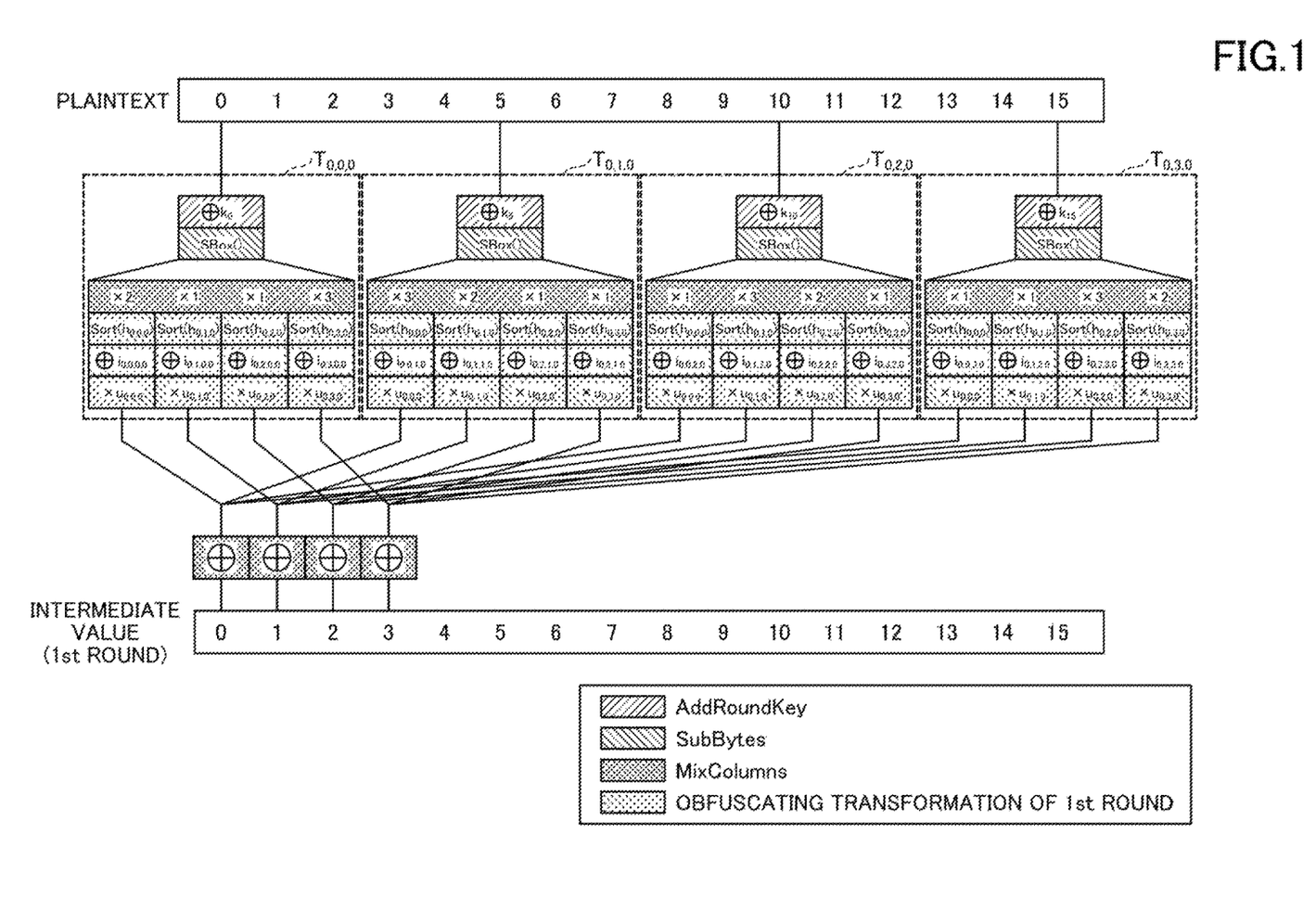
FIG. 1 is a diagram illustrating an example of a first sub-round process in a first round of encryption.

Hereinafter, as an example, the process of the first sub-round of the first round of the encryption (that is, when s=0) will be described with reference to FIG. 1. FIG. 1 is a diagram illustrating an example of the process of the first sub-round of the first round of the encryption.

As illustrated in FIG. 1, in the first sub-round of the first round, data of "0," "5," "10," and "15" is selected from the 16-byte plaintext, and the process is performed on these selected data (that is, 4 bytes of data). The process of selecting this 4-byte data is called a ShiftRows process. In the ShiftRows process, a 4-byte data different from that selected in the first sub-round is selected in a second sub-round, a 4-byte data different from those selected in the first and second sub-rounds is selected in a third sub-round, and a 4-byte data different from those selected in the first through third sub-rounds is selected in a fourth sub-round. More particularly, data of "4," "9," "14," and "3" is selected in the second sub-round, data of "8," "13," "2," and "7" is selected in the third sub-round, and data of "12," "1," "6," and "11" is selected in the fourth sub-round, for example. Hereinafter, a 1-byte data in the 4-byte data selected by the ShiftRows process is also referred to as "selected data".

In this case, in the first round of the white-box AES according to this embodiment, with respect to each of the selected data (data of "0," "5," "10," and "15" in the example illustrated in FIG. 1), an AddRoundKey process, a SubBytes process, a MixColumns process excluding an exclusive OR operation, and an obfuscating transformation of the first round are realized using a Look-Up Table (LUT). The MixColumns process includes a process to output a 4-byte data by performing a multiplication on the Galois field (in FIG. 1, the multiplication on the Galois field is represented by "×") four times on an output result of the SubBytes process, and a process to output a 4-byte data by performing an exclusive OR operation on a processed result of the obfuscating transformation.

Symbols used in FIG. 1 denote the following.

T: A look-up table for a jth selected data in a (s+1)th sub-round of a (r+1)th round, where subscripts s, j, r are used with respect to j=0, 1, 2, 3.

k: A key component with respect to the selected data of a dth byte in plaintext (where d is a remainder for the case where t is divided by 16), where a subscript t is used (where t=16r+4s+5j).

SBox(•): A function that performs the SubBytes process, and is represented by "SBox( )" in the figures.

Sort(•,h): A function that inputs a 8-bit data and a parameter h, and outputs a 8-bit data by sorting each bit value of the input data, and is represented by "Sort(h)" in the figures.

h: A parameter that represents the combination when sorting the 8-bit data into the 8-bit data. Subscripts s, m, r are used with respect to the indexes m=0, 1, 2, 3 of the multiplication included in the MixColumns process, to indicate that the parameter corresponds to the mth multiplication of the MixColumns process in the (s+1)th sub-round of the (r+1)th round. Since the number of combinations when sorting the 8 bit-data is 8!, h is represented by a 16-bit data ($\approx \log_2(8!)$) bit data. Accordingly, a security strength of the function Sort(•, h) is a 16-bit strength.

i: A random number computed by an exclusive OR with respect to a processed result of the function Sort(•,h). Subscripts s, m, j, r represent the random number corresponding to the mth multiplication of the MixColumns process with respect to the jth selected data in the (s+1)th sub-round of the (r+1)th round. The random number i is an 8-bit data. Accordingly, the security strength of the random number i is an 8-bit strength.

u: A value multiplied with respect to a result of the exclusive-OR operation (where u≠0 and a value exists for an inverse element $u^{-1}$). The value u is an 8-bit data. Here, because the multiplication on the Galois field corresponds to a multiplication on an irreducible polynomial, and the multiplication on the irreducible polynomial uses a constant (that is, a constant part of the irreducible polynomial) in the process of the multiplication, a result in accordance with the constant is obtained. On the other hand, for the inverse element $u^{-1}$ to exist, the constant of the irreducible polynomial must be a specific value, and the available types of constants are 30 ($\approx 2^5$). For this reason, the security strength of the value u is a 13-bit strength, from 8+5=13.

Therefore, the security strength of the obfuscated key (that is, the data subject to the exclusive-OR operation of the MixColumns process) is a 37-bit strength, from 16+8+13=37. As described above, in the first round of the white-box AES according to this embodiment, with respect to the selected data, the AddRoundKey process, the SubBytes process, the MixColumns process excluding the exclusive-OR operation, and the obfuscating transformation are realized using the look-up table.

Accordingly, when an arbitrary data of 8 bits is denoted by "a", a look-up table $T_{s,j,0}$ stores the results of the operations computed according to the following formula (1) (that is, the operation results of the AddRoundKey process, the Subbytes process, the MixColumns process excluding the exclusive-OR operation, and the obfuscating transformation of the first round with respect to the data "a"), where (c0,0,c1,0,c2,0,c3,0)=(2,1,1,3),
(c0,1,c1,1,c2,1,c3,1)=(3,2,1,1), (c0,2,c1,2,c2,2,c3,2)=(1,3,2,1), and
(c0,3,c1,3,c2,3,c3,3)=(1,1,3,2).
Hereinafter, the operation result stored in the look-up table T may also be referred to as an "operation value". This operation value is an 8-bit data.

$$f_{s,j,0}(a) = \begin{cases} (\text{Sort}(SBox(a \oplus k_{(4s+5j\bmod 16)}) \times C_{0,j}, h_{s,0,0}) \oplus i_{s,0,j,0}) \times u_{s,0,0} \\ (\text{Sort}(SBox(a \oplus k_{(4s+5j\bmod 16)}) \times C_{1,j}, h_{s,1,0}) \oplus i_{s,1,j,0}) \times u_{s,1,0} \\ (\text{Sort}(SBox(a \oplus k_{(4s+5j\bmod 16)}) \times C_{2,j}, h_{s,2,0}) \oplus i_{s,2,j,0}) \times u_{s,2,0} \\ (\text{Sort}(SBox(a \oplus k_{(4s+5j\bmod 16)}) \times C_{3,j}, h_{s,3,0}) \oplus i_{s,3,j,0}) \times u_{s,3,0} \end{cases} \quad (1)$$

[(r+1)Th Round]

Next, the processes of the second and subsequent rounds of encryption by the white-box AES according to this embodiment (that is, for the case where r>=1) will be described. In the second and subsequent rounds of encryption, an intermediate value output in the round one previous to the current round is input, and a 16-byte intermediate value is output.

Figure 2:
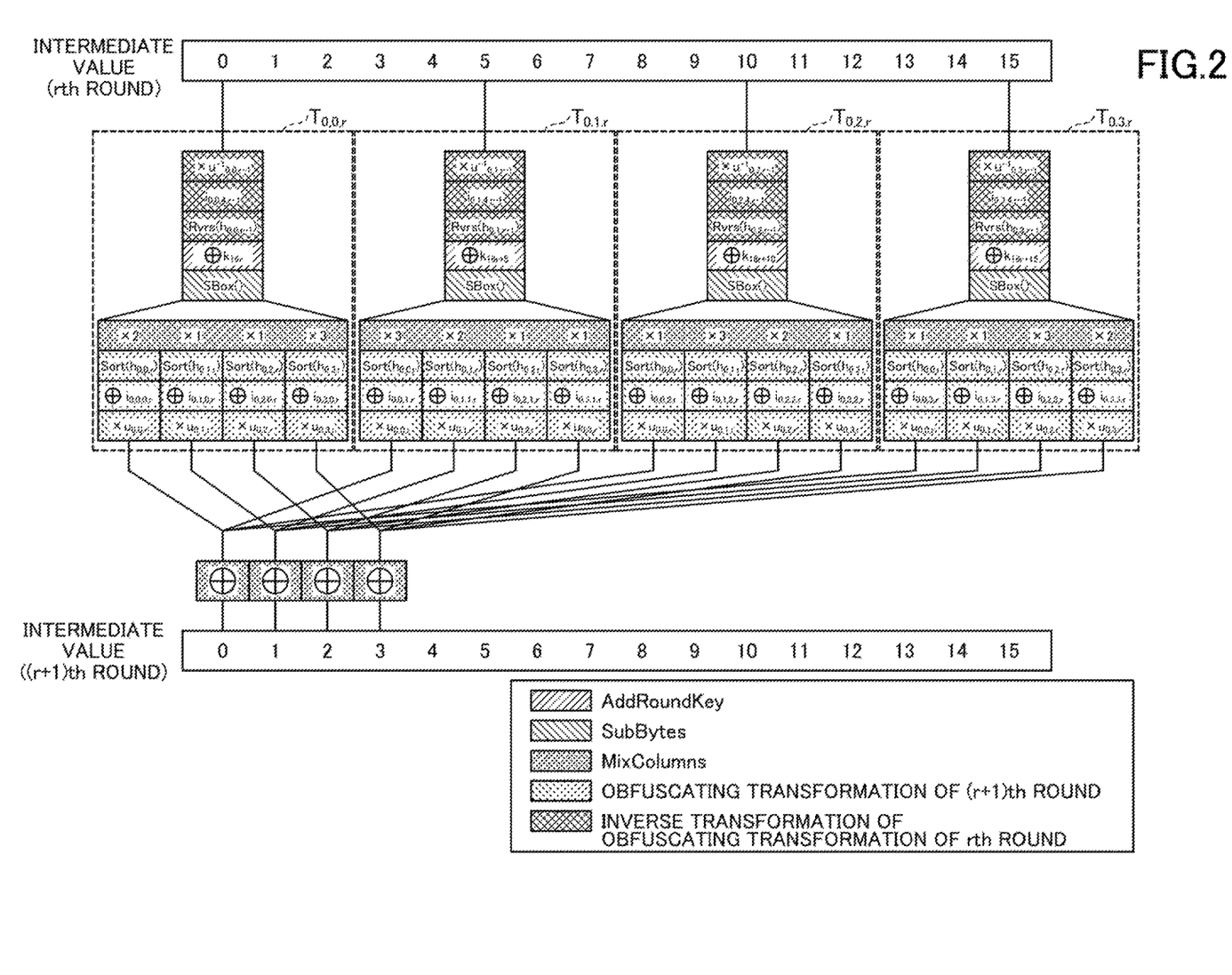
FIG. 2 is a diagram illustrating an example of the first sub-round process in the second and subsequent rounds of encryption.

Hereinafter, as an example, the process in the first sub-round of the (r+1)th round of encryption (that is, for the case where s=0), will be described with reference to FIG. 2. FIG. 2 is a diagram illustrating an example of the process in the first sub-round of the second and subsequent rounds of encryption.

As illustrated in FIG. 2, in the first sub-round of the (r+1)th round, each of the data of "0," "5," "10," and "15" among the intermediate values of the rth round, is selected as the selected data by ShiftRows process, and the process is performed on these selected data.

In this state, in the white-box AES according to this embodiment, with respect to each of the selected data (data of "0," "5," "10," and "15" in the example illustrated in FIG. 2), the inverse transformation, the AddRoundKey process, the SubBytes process, the MixColumns process excluding the exclusive-OR operation, and the obfuscating transformation of the (r+1)th round are realized using the look-up table. The inverse transformation is an inverse transformation of the obfuscating transformation of the rth round.

Symbols used in FIG. 2 denote the following. The symbols T, k, SBox(•), Sort(•, h), h, i, and u are the same as the symbols used in FIG. 1. However, the random number i in the inverse transformation of the obfuscating transformation of the rth round is determined from the random number i of the obfuscating transformation of the rth round. More particularly, $i_{s,j,4,r-1}$ in the inverse transformation of the obfuscating transformation of the rth round, is an exclusive-OR of $i_{s,j,0,r-1}$, $i_{j,1,r-1}$, $i_{s,j,2,r-1}$, and $i_{s,j,3,r-1}$ in the obfuscating transformation of the rth round.

$u^{-1}$: An inverse element of u with the same subscript.

Rvrs(•, h): An inverse transformation of Sort(•, h) with the same subscript h as the parameter, and is represented by "Rvrs(h)" in the figures.

Therefore, as in the first round, the security strength of the obfuscated key (that is, the data subject to the exclusive-OR operation of the MixColumns process) becomes 74 bits, which is the sum of the security strength (37-bit strength) of the inverse transformation with respect to the obfuscating transformation of the rth round, and the security strength (37-bit strength) of the obfuscating transformation of the (r+1)th round. As described above, in the (r+1)th round (where r>=1) of the white-box AES according to this embodiment, the inverse transformation of the obfuscating transformation of the rth round, the AddRoundKey process, the Sub-Bytes process, the MixColumns process excluding the exclusive-OR operation, and the obfuscating transformation of the (r+1)th round are realized using the look-up table.

Accordingly, when the arbitrary data of 8 bits is denoted by "a", operation results computed according to the following formula (3) using a' computed according to the following formula (2) (that is, the operation results of the inverse transformation of the obfuscating transformation of the rth round, the AddRoundKey process, the SubBytes process, the MixColumns process excluding the exclusive-OR operation, and the obfuscating transformation of the (r+1)th round with respect to the data "a") are stored in the look-up table $T_{s,j,r}$ as the operation values.

$$a' = Rvrs(a \times u_{s,j,r-1}^{-1} \oplus i_{s,j,4,r-1}, h_{s,j,r-1}) \quad (2)$$

$$f_{s,j,r}(a) = \quad (3)$$

$$\begin{cases} (\text{Sort}(SBox(a' \oplus k_{(16r+(4s+5j\bmod 16))}) \times C_{0,j}, h_{s,0,r}) \oplus i_{s,0,j,r}) \times u_{s,0,r} \\ (\text{Sort}(SBox(a' \oplus k_{(16r+(4s+5j\bmod 16))}) \times C_{1,j}, h_{s,1,r}) \oplus i_{s,1,j,r}) \times u_{s,1,r} \\ (\text{Sort}(SBox(a' \oplus k_{(16r+(4s+5j\bmod 16))}) \times C_{2,j}, h_{s,2,r}) \oplus i_{s,2,j,r}) \times u_{s,2,r} \\ (\text{Sort}(SBox(a' \oplus k_{(16r+(4s+5j\bmod 16))}) \times C_{3,j}, h_{s,3,r}) \oplus i_{s,3,j,r}) \times u_{s,3,r} \end{cases}$$

As described above, $i_{s,j,4,r-1}$ is determined according to the following formula (4), where
(c0,0,c1,0,c2,0,c3,0)=(2,1,1,3),
(c0,1,c1,1,c2,1,c3,1)=(3,2,1,1),
(c0,2,c1,2,c2,2,c3,2)=(1,3,2,1), and
(c0,3,c1,3,c2,3,c3,3)=(1,1,3,2).

$$i_{s,j,4,r-1} = i_{s,j,0,r-1} \oplus i_{s,j,1,r-1} \oplus i_{s,j,2,r-1} \oplus i_{s,j,3,r-1} \quad (4)$$

FIG. 2 described above illustrates the process for a case where the (r+1)th round is not the last (or final) round (that is, the (r+1)th round is an intermediate round). In the last round, the MixColumns process and the obfuscating transformation in FIG. 2 are not performed. In other words, in the last round, the inverse transformation of the obfuscating transformation in the round one previous to the final round, the AddRoundKey process, and the SubBytes process are performed. The intermediate value output in the final round becomes a ciphertext. Accordingly, in the final round of white-box AES according to this embodiment, the inverse transformation of the obfuscating transformation in the round one previous to the final round, the AddRoundKey process, and the SubBytes process are realized using the look-up table. In the final round, the security strength is the 37-bit strength, similar to that of the first round (the round when r=0).

<Functional Configuration>

Figure 3:
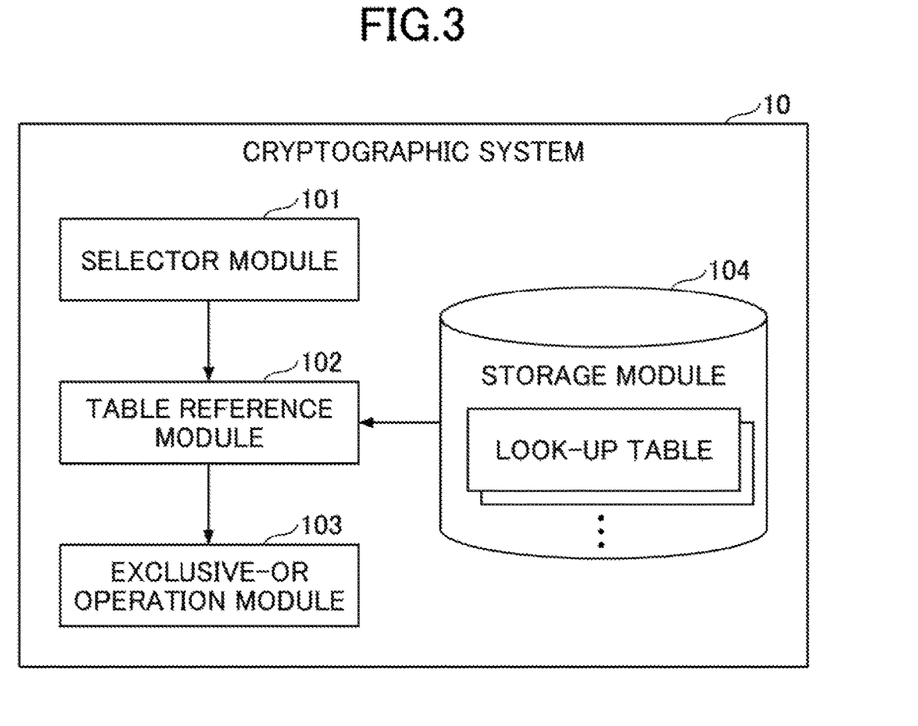
FIG. 3 is a diagram illustrating an example of a functional configuration of a cryptographic system according to one embodiment.

Next, a functional configuration of the cryptographic system 10 according to this embodiment will be described, with reference to FIG. 3. FIG. 3 is a diagram illustrating an example of the functional configuration of the cryptographic system 10 according to this embodiment.

As illustrated in FIG. 3, the cryptographic system 10 according to this embodiment includes a selector module 101, a table reference module 102, an exclusive-OR operation module 103, and a storage module 104.

The look-up table $T_{s,j,r}$ is stored in the storage module 104. Various data (for example, plaintext, intermediate value, ciphertext, or the like) used for encryption may be stored in the storage module 104.

When r=0, the selector module 101 selects the selected data from the plaintext for every sub-round. When r>=1, the selector module 101 selects the selected data from the intermediate value of the rth round for every sub-round.

The table reference module 102 acquires operation values corresponding to the selected data, by referring to the lookup table $T_{s,j,r}$ stored in the storage module 104. As illustrated in the formula (1) and the formula (2) described above, four operation values are acquired from one selected data (that is, one byte of data). In other words, the operation values respectively corresponding to the indexes m=0, 1, 2, and 3 of the multiplication included in the MixColumns process are acquired.

The exclusive-OR operation module 103 computes the exclusive-OR of mutually corresponding operation values for every sub-round of the (r+1)th round (where r>=0).

More particularly, in the (s+1)th sub-round of the (r+1)th round, the exclusive-OR operation module 103 computes the exclusive-OR of the operation value corresponding to m=0 of the j=0th selected data, the operation value corresponding to m=0 of the j=1st selected data, the operation value corresponding to m=0 of the j=2nd selected data, and the operation value corresponding to m=0 of the j=3rd selected data, and regards the computed value as the data of the (4s+1)th byte of the intermediate value of the (r+1)th round. Similarly, in the (s+1)th sub-round of the (r+1)th round, the exclusive-OR operation module 103 computes the exclusive-OR of the operation value corresponding to m=1 of the j=0th selected data, the operation value corresponding to m=1 of the j=1st selected data, the operation value corresponding to m=1 of the j=2nd selected data, and the operation value corresponding to m=1 of the j=3rd selected data, and regards the computed value as the data of the (4s+2)th byte of the intermediate value of the (r+1)th round. Similarly thereafter, in the (s+1)th sub-round of the (r+1)th round, the exclusive-OR operation module 103 computes the exclusive-OR of the operation value corresponding to m=2 of the j=0th selected data, the operation value corresponding to m=2 of the j=1st selected data, the operation value corresponding to m=2 of the j=2nd selected data, and the operation value corresponding to m=2 of the j=3rd selected data, and regards the computed value as the data of the (4s+3)th byte of the intermediate value of the (r+1)th round. Similarly, in the (s+1)th sub-round of the (r+1)th round, the exclusive-OR operation module 103 computes the exclusive-OR of the operation value corresponding to m=3 of the j=0th selected data, the operation value corresponding to m=3 of the j=1st selected data, the operation value corresponding to m=3 of the j=2nd selected data, and the operation value corresponding to m=3 of the j=3rd selected data, and regards the computed value as the data of the (4s+4)th byte of the intermediate value of the (r+1)th round. As a result, the intermediate values of the (r+1)th round (where r>=0) are obtained.

Accordingly, the selector module 101, the table reference module 102, and the exclusive-OR operation module 103 form an example of an acquiring means (or a processor) which performs an acquiring procedure to acquire the operation result with respect to the input data, by referring to the look-up table of the storage module 104. The look-up table stores the operation result of the operation process, including the obfuscating operation that includes the ordering of bits, the exclusive-OR operation on the random number, and the multiplication on the Galois field, performed on the data.

<Hardware Configuration>

Figure 4:
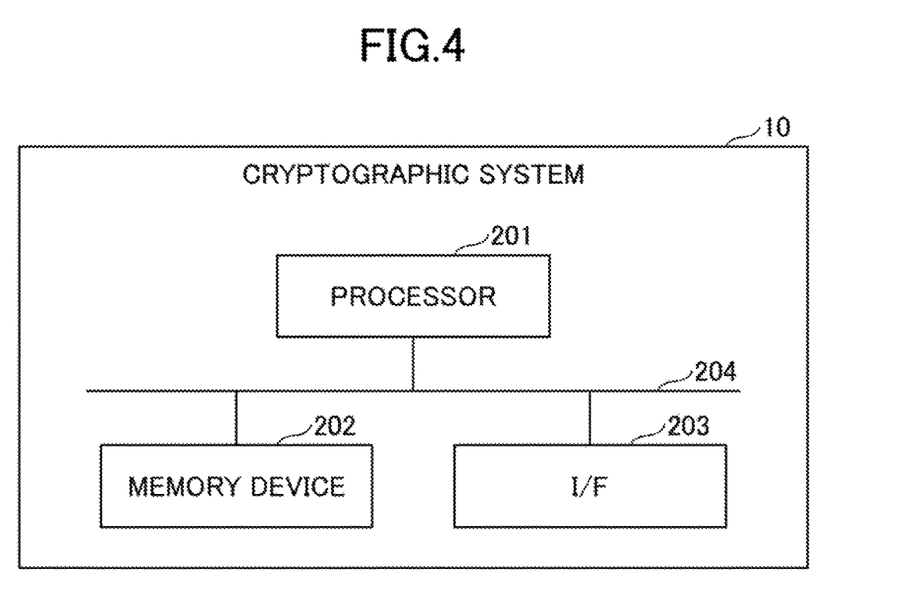
FIG. 4 is a diagram illustrating an example of a hardware configuration of the cryptographic system according to one embodiment.

Next, a hardware configuration of the cryptographic system 10 according to this embodiment will be described, with reference to FIG. 4. FIG. 4 is a diagram illustrating an example of the hardware configuration of the cryptographic system 10 according to this embodiment.

As illustrated in FIG. 4, the cryptographic system 10 according to this embodiment includes a processor 201, a memory device 202, and an interface (I/F) 203. Each hardware is communicably connected to each other via a bus 204. The cryptographic system 10 may be formed by a general-purpose computer, for example.

The processor 201 may be formed by any of a variety of computing devices, such as a Central Processing Unit (CPU), a Micro Processing Unit (MPU), or the like, for example. Each of the functional modules (the selector module 101, the table reference module 102, and the exclusive-OR operation module 103) of the cryptographic system 10 according to this embodiment may be realized by a process that is performed when the processor 201 executes one or more programs stored in the memory device 202.

The memory device 202 may be formed by any of a variety of storage devices, such as a Random Access Memory (RAM), a Read Only Memory (ROM), a flash memory, or the like, for example. The storage module 104 of the encryption system 10 according to this embodiment may be formed using the memory device 202, for example. The memory device 202 may be formed by a computer-readable storage medium, including a non-transitory computer-readable storage medium such as a semiconductor memory device, a magnetic recording medium, an optical recording medium, a magneto-optic recording medium, or the like, for example. The memory device 202 stores various programs including programs executed by the processor 201, and various data including the look-up table, or the like.

The I/F 203 is an interface for inputting data to the cryptographic system 10, and outputting data from the cryptographic system 10.

The cryptographic system 10 according to this embodiment has the hardware configuration illustrated in FIG. 4, in order to perform various processes. The hardware configuration illustrated in FIG. 4 is merely an example, and the cryptographic system 10 according to this embodiment may include a plurality of processors 201, and/or a plurality of memory devices 202.

<Process Flow>

Figure 5:
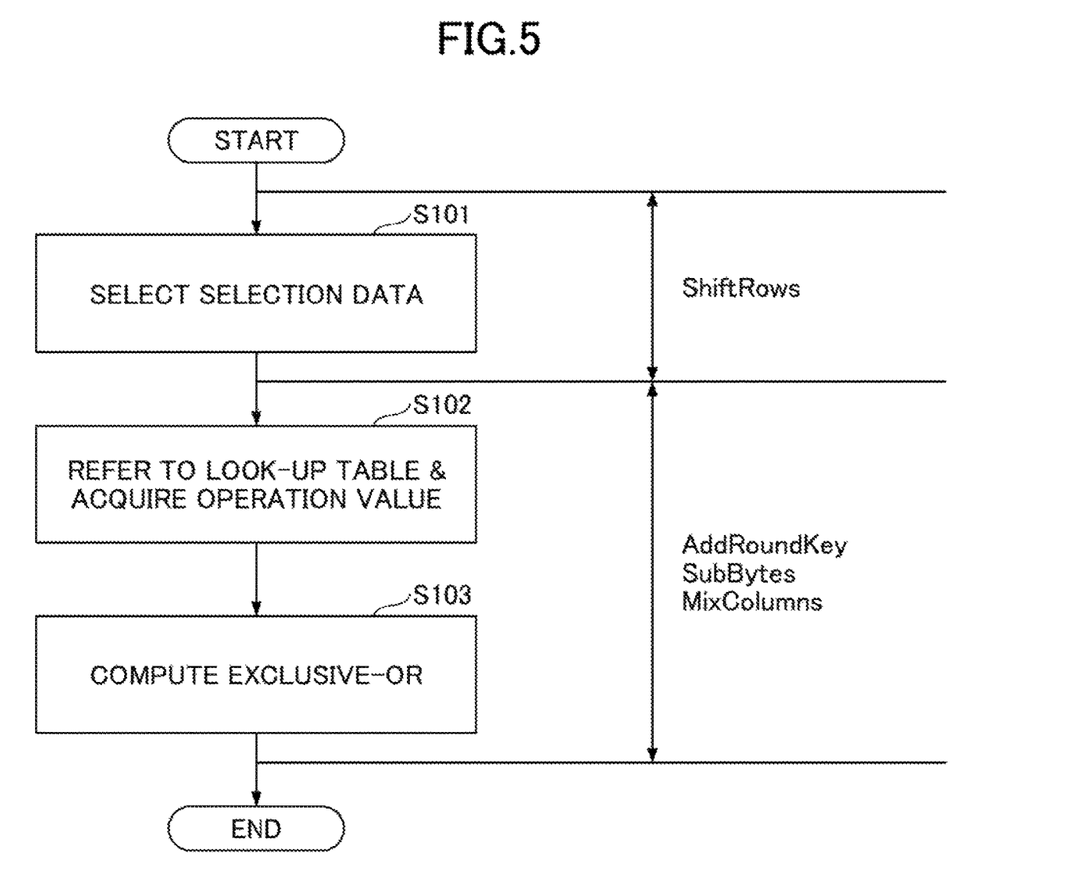
FIG. 5 is a diagram illustrating a process flow per one sub-round of encryption according to one embodiment.

Next, a process flow of encryption according to this embodiment will be described. As described above, the white-box AES according to this embodiment encrypts the data (plaintext) by repeatedly performing a number of rounds corresponding to the bit length of the key. One round is formed by four sub-rounds. Hence, in the following description, the process flow of the (s+1)th sub-round (where s>=0) of the (r+1)th round of encryption (where r>=0), will be described with reference to FIG. 5. FIG. 5 is a diagram illustrating a process flow per one sub-round of encryption according to this embodiment.

First, in step S101, the selector module 101 selects the selected data in the (s+1)th sub-round of the (r+1)th round. The selector module 101 selects four selected data from 16-byte plaintext when r=0, and selects four selected data from the 16-byte intermediate value of the rth round when r>=1. As described above, the selected data is a 1-byte data.

Next, in step S102, the table reference module 102 acquires the operation value corresponding to the selected data by referring to the look-up table $T_{s,j,r}$ stored in the storage module 104 for each of the selected data selected in step S101.

In step S103, the exclusive-OR operation module 103 performs the exclusive-OR operation using the operation value obtained from the look-up table $T_{s,j,r}$ in step S102. As a result, the intermediate value of the (r+1)th round is obtained.

Therefore, the cryptographic system 10 according to this present embodiment can perform the process of the (s+1)th sub-round (where s>=0) of the (r+1)th round (where r>=0). Hence, by repeatedly performing steps S101 through S103 described above for every sub-round in each round, the plaintext is encrypted into the ciphertext. Moreover, in the cryptographic system 10 according to this embodiment, the key can be obfuscated with the security strength of 37-bit strength in the first round and the last round, and with the security strength of 74-bit strength in the intermediate rounds.

The case where the plaintext is encrypted is described in this embodiment. However, when decrypting the ciphertext, each round can be realized by configuring each round so as to become the inverse transformation of encryption. More particularly, an InvShiftRows process is used in place of the ShiftRows process, a InvSubBytes process is used in place of the SubBytes process, and a InvMixColumns process is used in place of the MixColumns process. Further, the inverse transformation of the obfuscating transformation in the last round of encryption is performed before the AddRoundKey process of the first round of decryption, and the obfuscating transformation is not performed before the exclusive-OR operation of the InvMixColumns process in the last round of decryption. The ciphertext can be decrypted by making the described modifications.

<Modification>

Finally, a modification of the white-box AES according to this embodiment will be described. The white-box AES described above can obfuscate the key with the security strength of 37-bit strength. In this modification, however, the key can be obfuscated with a higher security strength, by combining a plurality of obfuscating transformations into the look-up table.

The formula formed by the multiplication on the Galois field and the sorting of the bits cannot be modified into an equivalent formula. For this reason, by combining the obfuscating transformation, described in conjunction with FIG. 1 and FIG. 2, N times (where N is an arbitrary integer greater than or equal to 2) into the look-up table, the security strength of L-bit strength can be realized, where $37 < L <= 37 \times N$ and $37 < L <= 256!$.

Figure 6:
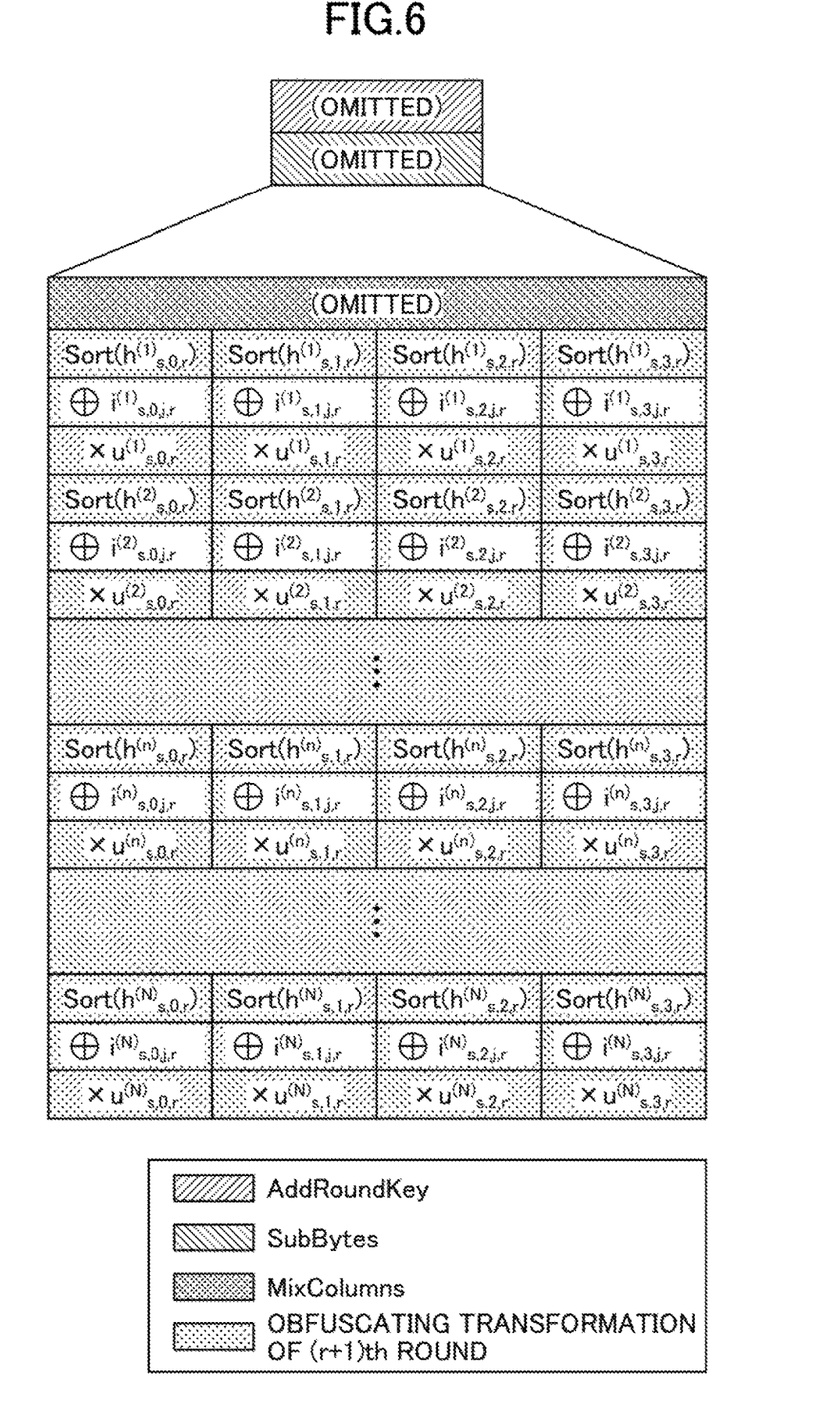
FIG. 6 is a diagram illustrating a modification of an obfuscating transformation of a (r+1)th round.
Figure 7:
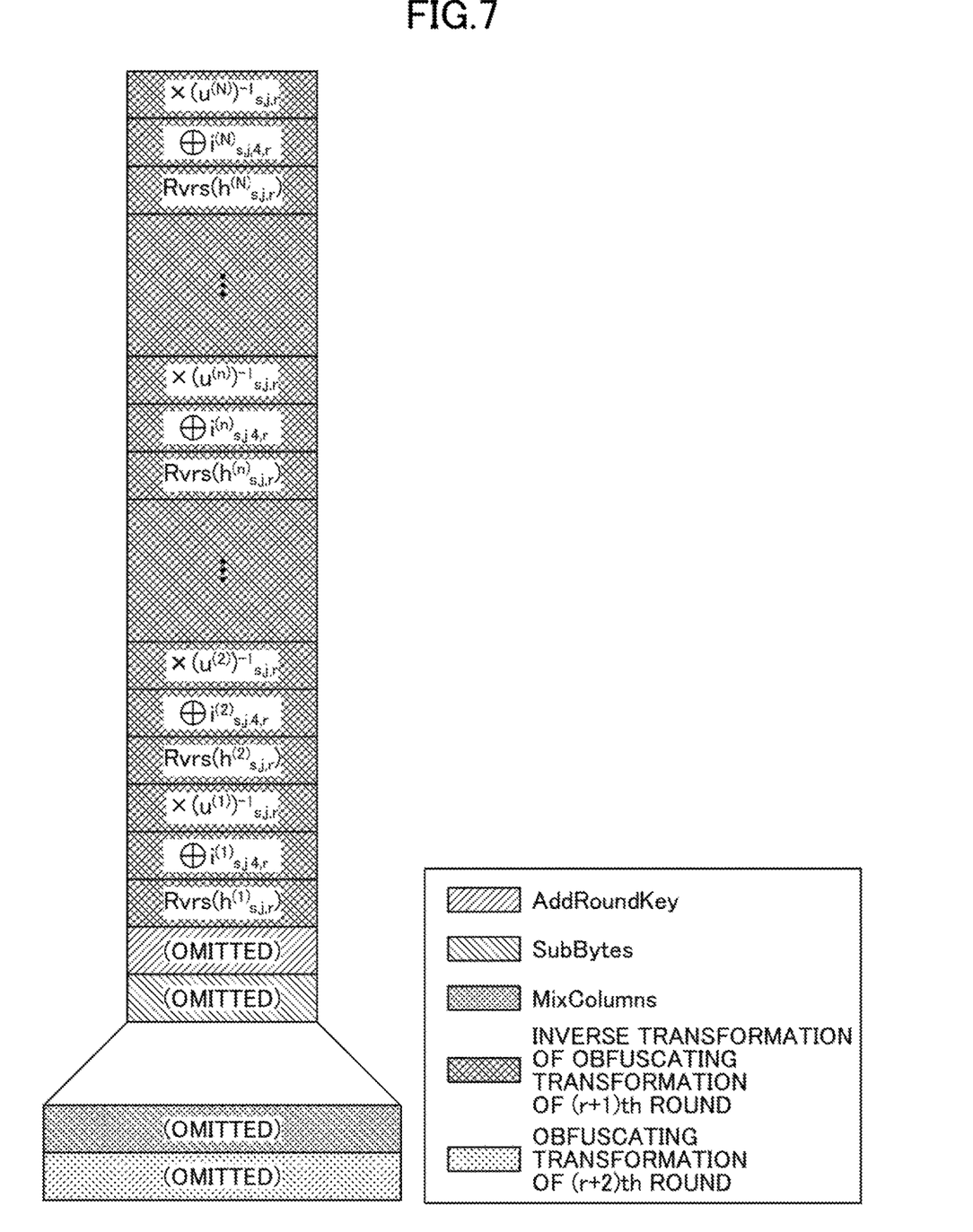
FIG. 7 is a diagram illustrating a modification of an inverse transformation of the obfuscating transformation in the (r+1)th round.

More particularly, as illustrated in FIG. 6, by combining the obfuscating transformation, described in conjunction with FIG. 1 and FIG. 2, N times, the obfuscating transformation of the (r+1)th round (where r>=0) is performed. In addition, the inverse transformation of the obfuscating transformation described in conjunction with FIG. 2 is combined N times, so that the inverse transformation of (r+1)th round (where r>=1) becomes the inverse transformation of the obfuscating transformation of the (r+1)th round, where n=1, ..., N, and different random numbers are used for each of the n's of i or the like (although some i's may have the same value).

Therefore, it is possible to realize the security strength of L-bit strength. In particular, by setting N to N>=4, it is possible to satisfy the security strength (128-bit strength) required on or after the year 2031 according to the National Institute of Information and Communications Technology (NICT) or the like.

According to the embodiments and modifications described above, it is possible to improve the security with respect to encryption key decryption in the white-box cryptography.

Further, the present invention is not limited to these embodiments, but various variations, modifications, substitutions, combinations with other techniques, or the like may be made without departing from the scope of the present invention.

What is claimed is:

1. An information processing apparatus comprising:
   a memory device configured to store a program; and
   a processor configured to execute the program and perform a process including:
   selecting data from plaintext for every sub-round of an rth round when r=0, and selecting the data from an intermediate value of the rth round for every sub-round when r>=1, as selected data, to thereby select a jth selected data in a (s+1)th sub-round of a (r+1)th round when r>=0 and s>=0, where r denotes a round of encryption, and s denotes a sub-round of the round of encryption,
   acquiring operation values corresponding to the selected data, by referring to a lookup table $T_{s,j,r}$ that stores an operation result of an operation process, including an obfuscating operation that includes ordering of bits, an exclusive-OR operation on a random number, and a multiplication on a Galois field, performed on data,
   computing an exclusive-OR of mutually corresponding operation values for every sub-round of the (r+1)th round, to thereby determine an intermediate value of the (r+1)th round, where r>=0, and
   repeating the selecting, the acquiring, and the computing for every sub-round in each round, to thereby encrypt the plaintext into ciphertext, wherein
   the selecting in each sub-round of each round includes a ShiftRows process,
   the operation process includes a AddRoundKey process, a SubBytes process, a MixColumns process which excludes an exclusive-OR operation, and an obfuscating transformation, and
   the operation process in the (r+1)th round includes an inverse transformation of the obfuscating transformation in the rth round, where r>=1.

2. The information processing apparatus as claimed in claim 1, wherein the operation process includes multiple obfuscating transformations that are mutually different.

3. The information processing apparatus as claimed in claim 1, wherein the memory device stores the look-up table $T_{s,j,r}$.

4. The information processing apparatus as claimed in claim 1, wherein the processor performs the process further including
   acquiring the operation values respectively corresponding to indexes m=0, 1, 2, and 3 of a multiplication included in the MixColumns process, to thereby acquire four operation values corresponding to one selected data.

5. The information processing apparatus as claimed in claim 4, wherein each round of encryption is a round of encryption by white-box advanced encryption standard.

6. The information processing apparatus as claimed in claim 1, wherein
   the MixColumns process and the obfuscating transformation are not performed in a final round which is other than the (r+1)th round, and
   the inverse transformation of the obfuscating transformation in a round one previous to the final round, the AddRoundKey process, and the SubBytes process are performed in the final round, thereby outputting the intermediate value in the final round as the ciphertext.

7. An information processing method comprising:
- a selecting procedure, performed by a computer, to select data from plaintext for every sub-round of an rth round when r=0, and select the data from an intermediate value of the rth round for every sub-round when r>=1, as selected data, to thereby select a jth selected data in a (s+1)th sub-round of a (r+1)th round when r>=0 and s>=0, where r denotes a round of encryption, and s denotes a sub-round of the round of encryption;
- an acquiring procedure, performed by the computer, to acquire operation values corresponding to the selected data, by referring to a lookup table $T_{s,j,r}$ that stores an operation result of an operation process, including an obfuscating operation that includes ordering of bits, an exclusive-OR operation on a random number, and a multiplication on a Galois field, performed on data;
- a computing procedure, performed by the computer, to compute an exclusive-OR of mutually corresponding operation values for every sub-round of the (r+1)th round, to thereby determine an intermediate value of the (r+1)th round, where r>=0; and
- a repeating procedure, performed by the computer, to repeat the selecting procedure, the acquiring procedure, and the computing procedure for every sub-round in each round, to thereby encrypt the plaintext into ciphertext, wherein
- the selecting procedure in each sub-round of each round includes a ShiftRows process,
- the operation process includes a AddRoundKey process, a SubBytes process, a MixColumns process which excludes an exclusive-OR operation, and an obfuscating transformation, and
- the operation process in the (r+1)th round includes an inverse transformation of the obfuscating transformation in the rth round, where r>=1.

8. The information processing method as claimed in claim 7, wherein the operation process includes multiple obfuscating transformations that are mutually different.

9. The information processing method as claimed in claim 7, further comprising:
- a procedure, performed by the computer, to acquire the operation values respectively corresponding to indexes m=0, 1, 2, and 3 of a multiplication included in the MixColumns process, to thereby acquire four operation values corresponding to one selected data.

10. The information processing method as claimed in claim 9, wherein each round of encryption is a round of encryption by white-box advanced encryption standard.

11. The information processing method as claimed in claim 7, wherein
- the MixColumns process and the obfuscating transformation are not performed in a final round which is other than the (r+1)th round, and
- the inverse transformation of the obfuscating transformation in a round one previous to the final round, the AddRoundKey process, and the SubBytes process are performed in the final round, thereby outputting the intermediate value in the final round as the ciphertext.

12. A non-transitory computer-readable storage medium having stored therein a program which, when executed by a computer, causes the computer to perform a process including:
- selecting data from plaintext for every sub-round of an rth round when r=0, and selecting the data from an intermediate value of the rth round for every sub-round when r>=1, as selected data, to thereby select a jth selected data in a (s+1)th sub-round of a (r+1)th round when r>=0 and s>=0, where r denotes a round of encryption, and s denotes a sub-round of the round of encryption;
- acquiring operation values corresponding to the selected data, by referring to a look-up table $T_{s,j,r}$ that stores an operation result of an operation process, including an obfuscating operation that includes ordering of bits, an exclusive-OR operation on a random number, and a multiplication on a Galois field, performed on data;
- computing an exclusive-OR of mutually corresponding operation values for every sub-round of the (r+1)th round, to thereby determine an intermediate value of the (r+1)th round, where r>=0; and
- repeating the selecting, the acquiring, and the computing for every sub-round in each round, to thereby encrypt the plaintext into ciphertext, wherein
- the selecting in each sub-round of each round includes a ShiftRows process,
- the operation process includes a AddRoundKey process, a SubBytes process, a MixColumns process which excludes an exclusive-OR operation, and an obfuscating transformation, and
- the operation process in the (r+1)th round includes an inverse transformation of the obfuscating transformation in the rth round, where r>=1.

13. The non-transitory computer-readable storage medium as claimed in claim 12, wherein the operation process includes multiple obfuscating transformations that are mutually different.

14. The non-transitory computer-readable storage medium as claimed in claim 12, wherein the program which, when executed by the computer, causes the computer to perform the process further including:
- acquiring the operation values respectively corresponding to indexes m=0, 1, 2, and 3 of a multiplication included in the MixColumns process, to thereby acquire four operation values corresponding to one selected data.

15. The non-transitory computer-readable storage medium as claimed in claim 14, wherein each round of encryption is a round of encryption by white-box advanced encryption standard.

16. The non-transitory computer-readable storage medium as claimed in claim 12, wherein
- the MixColumns process and the obfuscating transformation are not performed in a final round which is other than the (r+1)th round, and
- the inverse transformation of the obfuscating transformation in a round one previous to the final round, the AddRoundKey process, and the SubBytes process are performed in the final round, thereby outputting the intermediate value in the final round as the ciphertext.

* * * * *